United States Patent [19]

Jureit et al.

[11] 4,081,893

[45] Apr. 4, 1978

[54] METHODS FOR FORMING WOODEN JOINTS

[75] Inventors: John Calvin Jureit, Coral Gables; Roy Leutwyler, Miami; Larry Brodsky, Sunrise; Benjamin Kushner, Miami; Andrew G. Seipos, Miami; Adolfo Castillo, Miami, all of Fla.

[73] Assignee: Automated Building Components, Inc., Miami, Fla.

[21] Appl. No.: 711,499

[22] Filed: Aug. 4, 1976

Related U.S. Application Data

[62] Division of Ser. No. 594,247, Jul. 9, 1975, abandoned, which is a division of Ser. No. 509,567, Sep. 26, 1974, Pat. No. 3,964,663.

[51] Int. Cl.² .............................................. B23P 11/00

[52] U.S. Cl. .................................. 29/432; 29/526 R; 144/318; 227/95; 227/152

[58] Field of Search ..................... 29/432, 200 R, 526; 227/86, 95, 152, 99, 100; 144/309 L, 310 R, 313, 318

[56] References Cited

U.S. PATENT DOCUMENTS

| | | | |
|---|---|---|---|
| 598,307 | 2/1898 | Leffler | 227/86 |
| 3,086,210 | 4/1963 | Good et al. | 227/152 X |
| 3,705,452 | 12/1972 | Motta | 29/526 X |
| 3.716.179 | 2/1973 | Frydenberg et al. | 227/152 X |
| 3,871,061 | 3/1975 | Abernathy | 29/432 X |
| 3,930,299 | 1/1976 | Farrington et al. | 227/152 X |
| 3,939,548 | 2/1976 | Jureit et al. | 29/432 |

*Primary Examiner*—Victor A. DiPalma
*Attorney, Agent, or Firm*—LeBlanc & Shur

[57] ABSTRACT

The method includes the use of a conveyor table mounting press assemblies above and below the table respectively. Coils of connector plate stock having prepunched integrally extending teeth feed upper and lower press platens of the press assemblies, the platens being movable toward one another to substantially simultaneously cut the connector stock to predetermined lengths to form connector plates and embed the teeth of the connector plates on opposite sides of a joint formed by a pair of wooden frame members disposed in end-to-end butting relation on the conveyor between the press assemblies. To join a pair of wooden members end to end in butting relation, the members are displaced forwardly along the conveyor table with the trailing member offset laterally from the leading member until the offset member butts a stop which locates the butt joint in accurate registration between the press platens. Clamp cylinders displace both members against a fence to longitudinally align the members. The press platens thereafter move to cut discrete plates from the coils and embed the teeth thereof into the opposite sides of the joint.

7 Claims, 12 Drawing Figures

METHODS FOR FORMING WOODEN JOINTS

This is a division of application Ser. No. 594,247, filed July 9, 1975, now abandoned, which is in turn a division of application Ser. No. 509,567, filed Sept. 26, 1974, now U.S. Pat. No. 3,964,663.

The present invention relates to methods for joining butted wooden members one to the other and particularly relates to methods for providing discrete connector plates of the type having prepunched integrally extending teeth from coiled strips thereof and substantially simultaneously embedding the plates into the opposite sides of a pair of endwise butted, longitudinally aligned, wooden members to form a unitary wooden member.

In copending U.S. patent application Ser. No. 317,095 filed Dec. 20, 1972 of common assignee herewith, now abandoned in favor of co-pending application Ser. No. 488,006, filed July 12, 1974, now U.S. Pat. No. 3,913,816 there is disclosed an apparatus for forming wooden frames. The disclosure of application Serial No. 317,095 filed Dec. 20, 1972 is incorporated herein by reference as though fully set forth herein. In that application, there is disclosed coils of connector strip or stock of the type having teeth struck integrally therefrom. This stock is fed from the coils to a frame fabricating machine which substantially simultaneously cuts the connector stock to required lengths to form connector plates, locates the plates on opposite sides of the joints of the frames undergoing fabrication, and embeds the teeth of the connector plates into such joints. More particularly, a pair of C-frame assemblies each carrying upper and lower press heads are mounted on opposite sides of a conveyor. Each C-frame carries a pair of coils of connector stock from which the stock is fed to the respective upper and lower press platens in a direction at right angles to the direction of movement of the frames along the conveyor. The press platens cut discrete lengths of connector plates from the coils and embed the teeth of the platens into opposite sides of the wooden members forming the joints of the frame undergoing fabrication. In that arrangement, the joint is formed between right-angularly related members. It will be appreciated that with such arrangement, the connector plates must be embedded such that the elongated slots left in the connector plates by striking the elongated teeth therefrom extend in a direction normal to the joint line between the right-angularly related members. This is necessary to ensure maximum joint strength.

It has been found, however, that it is very often desirable to connect or join wooden members or pieces which lie in end-to-end butting relation one to the other. That is, it is desirable to connect two lumber pieces in end-to-end butting relation whereby a single unitary piece is formed having a length equal to the combined length of the two previous discrete pieces. In effect, this makes a single unitary integral piece from two or more shorter pieces. This is particularly desirable in that short or defective pieces previously marked for scrap can be salvaged and pieced together to form longer unitary pieces without sacrifice of strength. For example, rather than scrapping short pieces of wood, the method of the present invention permits such short pieces to be joined in end to end relation one to the other whereby longer useful pieces are formed. Also, where previously a lumber piece would be scrapped or rendered unusable because of an irregularity or weak spot in the lumber, i.e., a large knot, by utilizing the present invention, the weakened portion or the knot can be spanned by a plate of the type disclosed herein without having to cut the lumber. Thus, great savings in lumber as well as savings in the expense of the final product utilizing the lumber can be effected.

To accomplish the foregoing, the present invention uses a frame carrying a conveyor and upper and lower press head assemblies in overlying and underlying relation respectively to the conveyor. Each press head assembly includes a platen which is movable toward and away from the opposite platen. Each press platen carries a cutting blade for movement therewith which cooperates with a fixed cutting blade also carried by the press assembly to cut a selected length of connector plate from the coiled connector stock as the latter is fed to each press head assembly by a feed assembly. The upper and lower press platens carry the cut connector plates for embedment of the teeth thereof into the opposite sides of the longitudinally aligned wooden members disposed on the conveyor, the joint therebetween being located between the press platens.

The coils of connector plate stock are carried on the frame respectively above and below the conveyor such that the stock is supplied to the platens in a direction parallel to the direction in which the lumber pieces are supplied along the conveyor. In this manner, the teeth in the connector plate stock and the connector plate formed therefrom are properly aligned with the joint for maximum joint strength. That is, the elongated slots left in the connector plates extend in a direction normal to the joint line between the butting wooden members. As described in the aforementioned patent application, the present method uses a feed mechanism for advancing discrete lengths of connector plate stock between the press platens and ensuring that the rows of teeth of the stock do not register with the movable and fixed cutting blades, i.e., ensuring that the blades do not cut through the teeth but rather cut the stock through portions thereof between the rows of teeth.

A significant feature of the present invention resides in locating the joint in vertical registry between the press platens. To accomplish this, a stop is provided on one side of the conveyor at a like elevation as the lumber passing along the conveyor. The stop is selectively located between the press platens such that its rear edge lies vertically between the center of the lengths of connector plate stock disposed between the press platens. The rear edge of this pin or stop thus defines the desired location of the joint line between the end to end butted wooden members in relation to the platens and the connector plate stock disposed between the platens. In joining two lumber pieces, a leading lumber piece is disposed on the conveyor against a fence on the side thereof remote from the stop. The trailing lumber piece is disposed against a fence on the other side of the conveyor with its forward end butting the trailing end of the leading lumber piece. The two lumber pieces are advanced along the conveyor in this lateral staggered relation until the forward end of the trailing lumber piece butts the stop. As the lumber pieces are advanced, the forward lumber piece is disposed under a roller which creates a drag on its forward movement. Accordingly, when the trailing lumber piece butts the stop, both lumber pieces stop and the joint therebetween is accurately transversely aligned between the press platens and the connector plate stock disposed therebetween. Clamps are provided on the side of the conveyor which carries the stop. After obtaining accurate transverse alignment, the clamps are actuated to displace both lumber pieces against the fence remote from the stop. This lateral displacement maintains the joint line between the lumber pieces in transverse alignment between the press platens while simultaneously providing for longitudinal alignment of the joint between the lumber pieces. With the clamps maintaining the lumber butted against the fence, the platens are moved toward one another to cut discrete lengths of connector plates from the stock and embed the teeth thereof into opposite sides of the butting ends of the lumber pieces. Upon retraction of the platens, the finished piece may be removed from the conveyor or a third lumber piece may be disposed on the conveyor and joined to the trailing end of the trailing piece in a manner as previously described.

Accordingly, it is a primary object of the present invention to provide novel and improved methods for joining wooden members one to the other.

It is another object of the present invention to provide novel and improved methods for eliminating scrap lumber and forming integral unitary elongated lumber pieces from two or more scrap lumber pieces thereby effectively utilizing a larger percentage of available lumber.

It is a further object of the present invention to provide novel and improved methods for applying connector plates from coils of connector stock to the joints between butting longitudinally aligned wooden members.

These and further objects and advantages of the present invention will become more apparent upon reference to the following specification, appended claims and drawings wherein:

Figures 1, 2, 6:
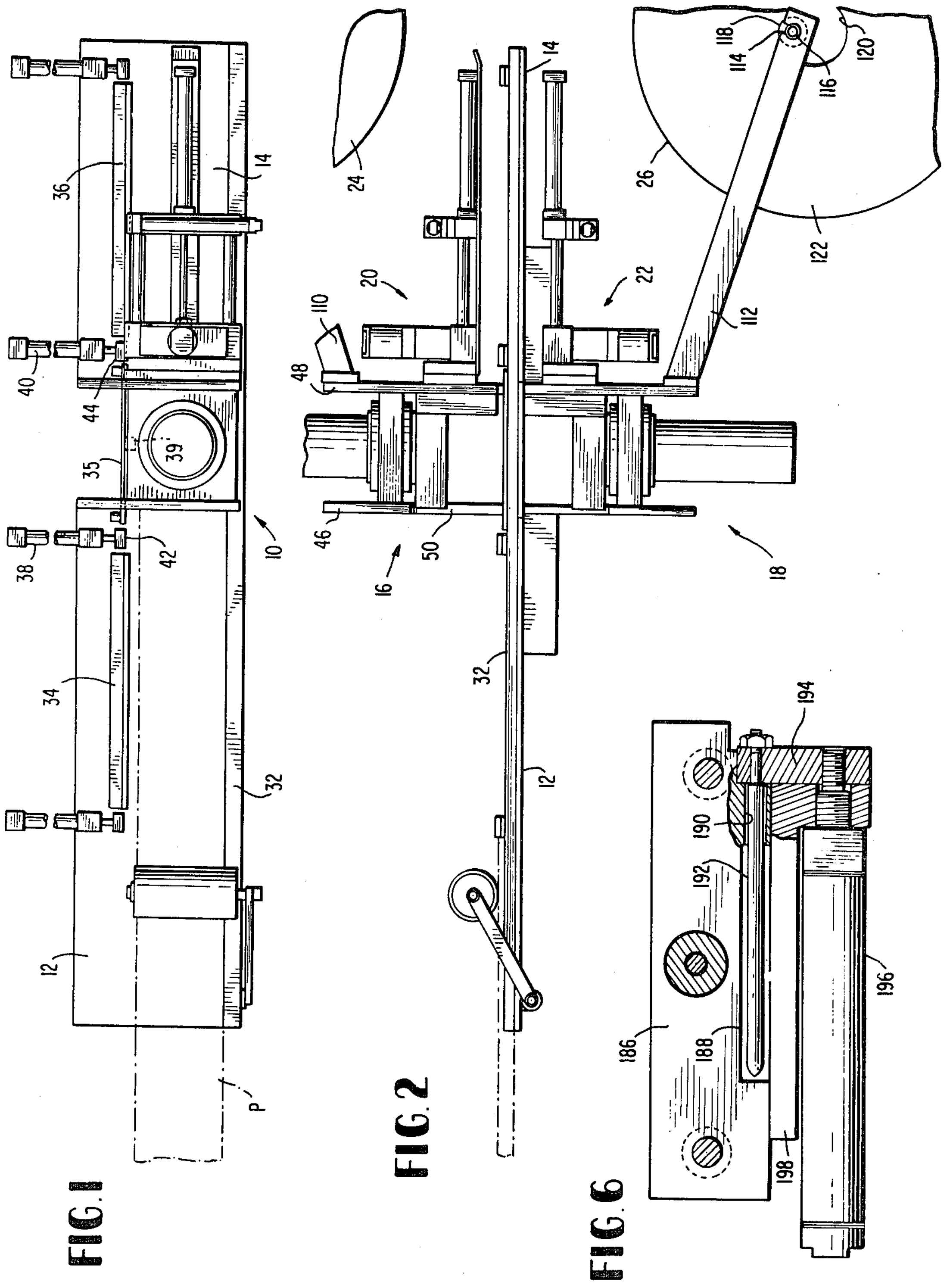
FIG. 1 is a top plan view of an apparatus constructed in accordance with the present invention and illustrated with parts broken out for clarity.
FIG. 2 is a fragmentary side elevational view thereof.
Figure 3:
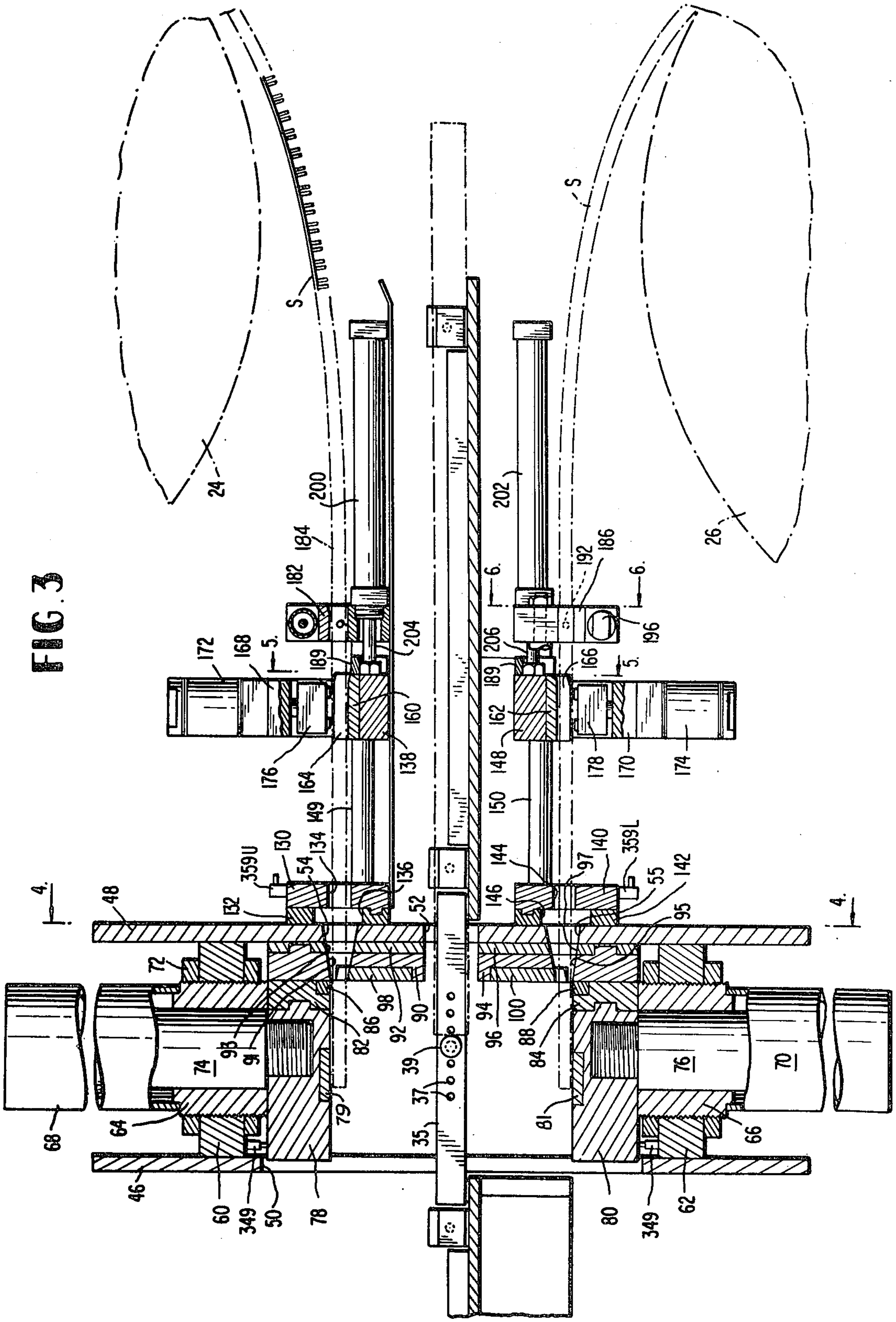
FIG. 3 is an enlarged cross-sectional view thereof.
Figure 5:
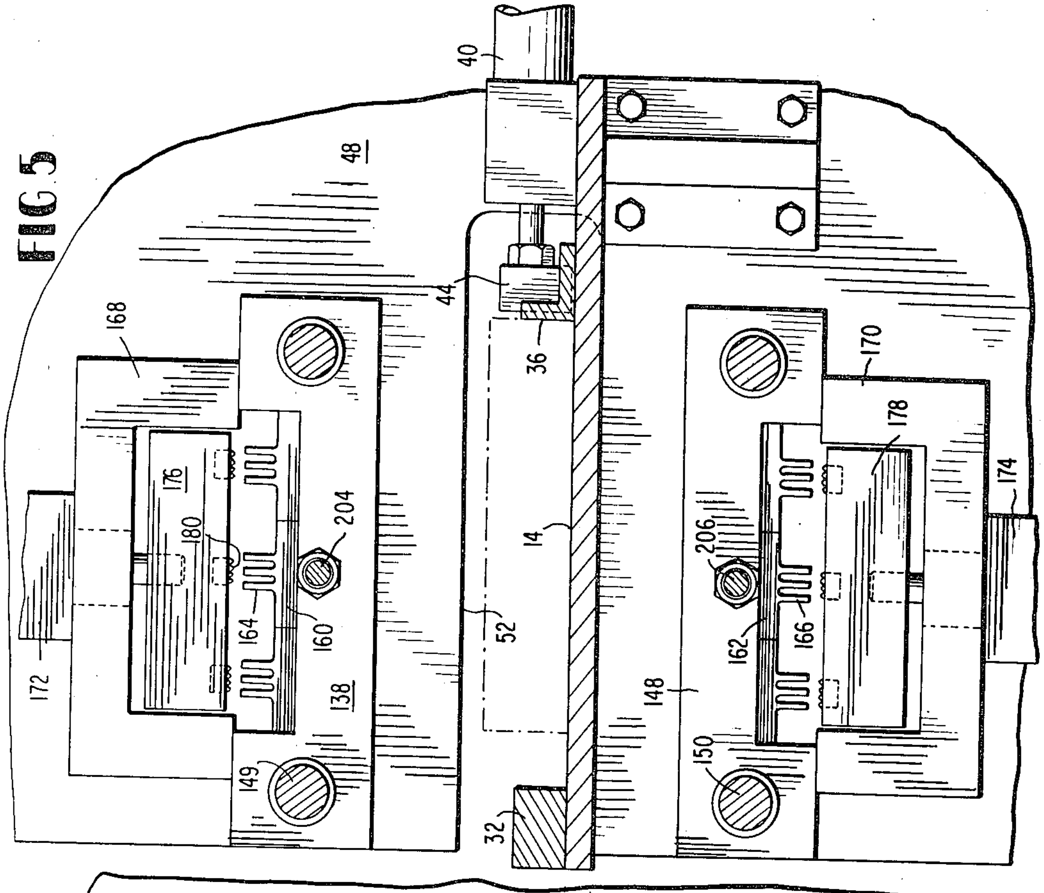
Figure 4:
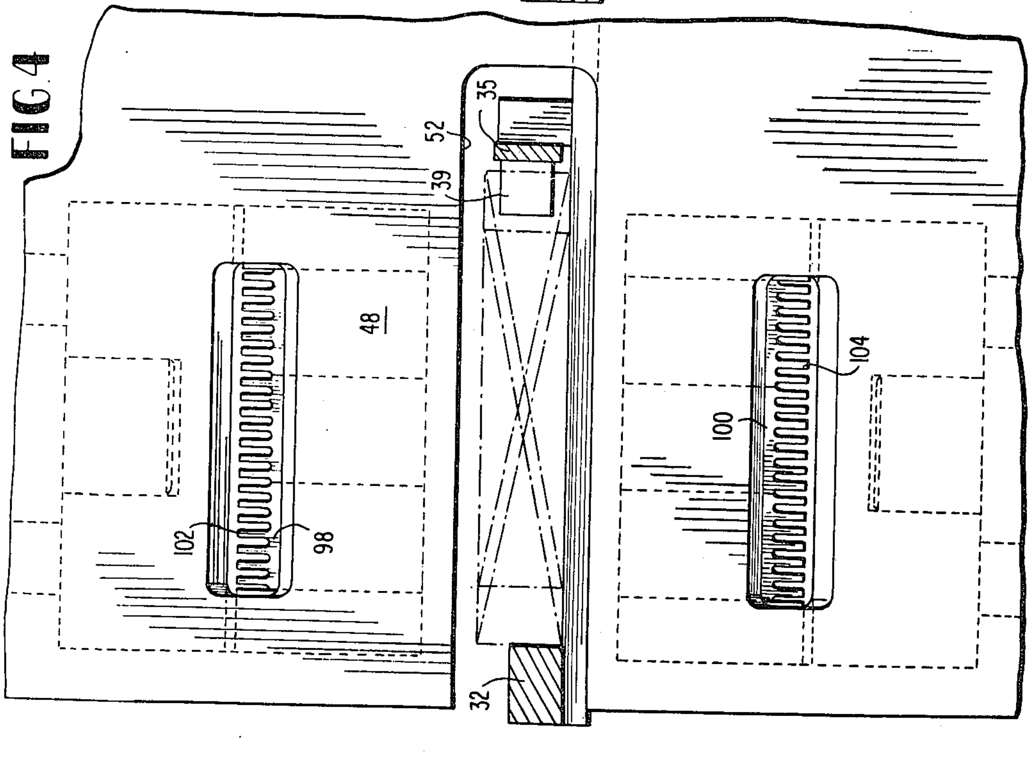
Figure 7:
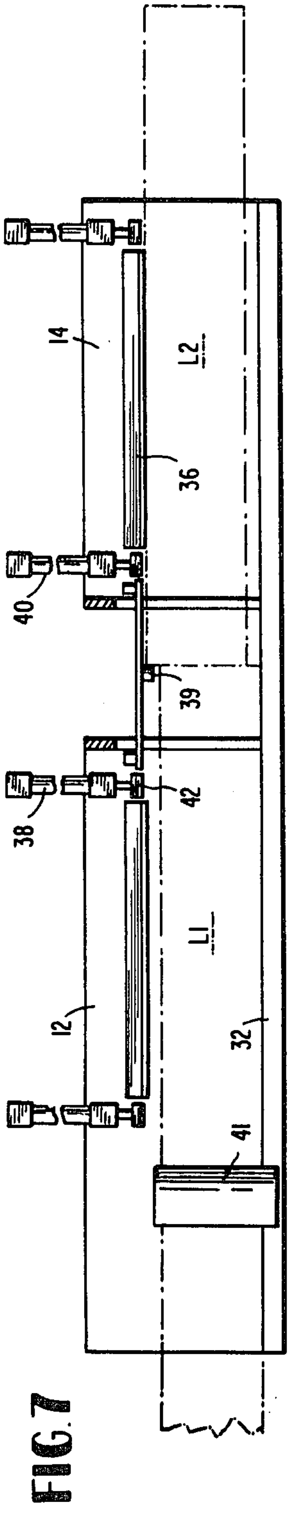
Figure 8:
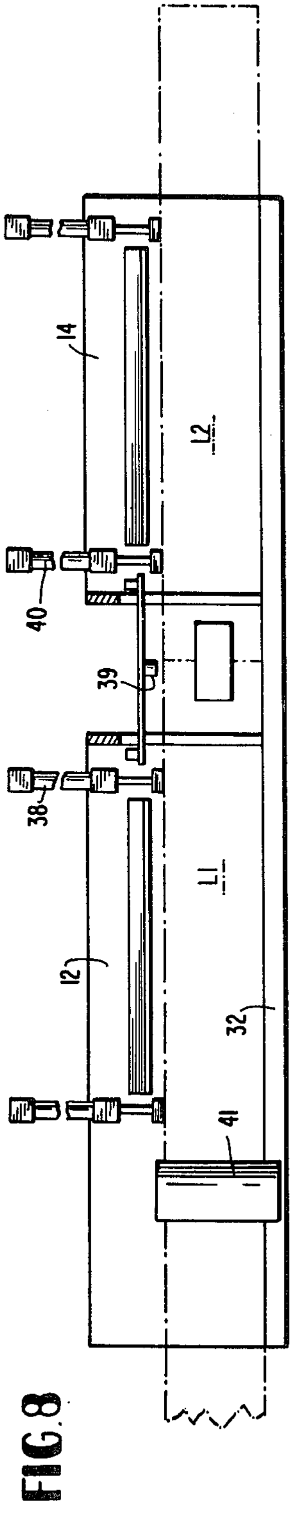
Figure 9:
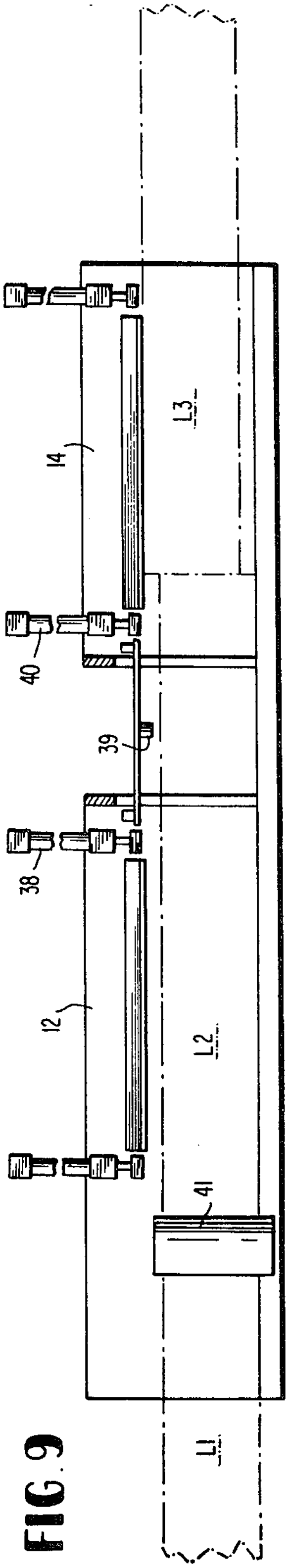
Figure 10:
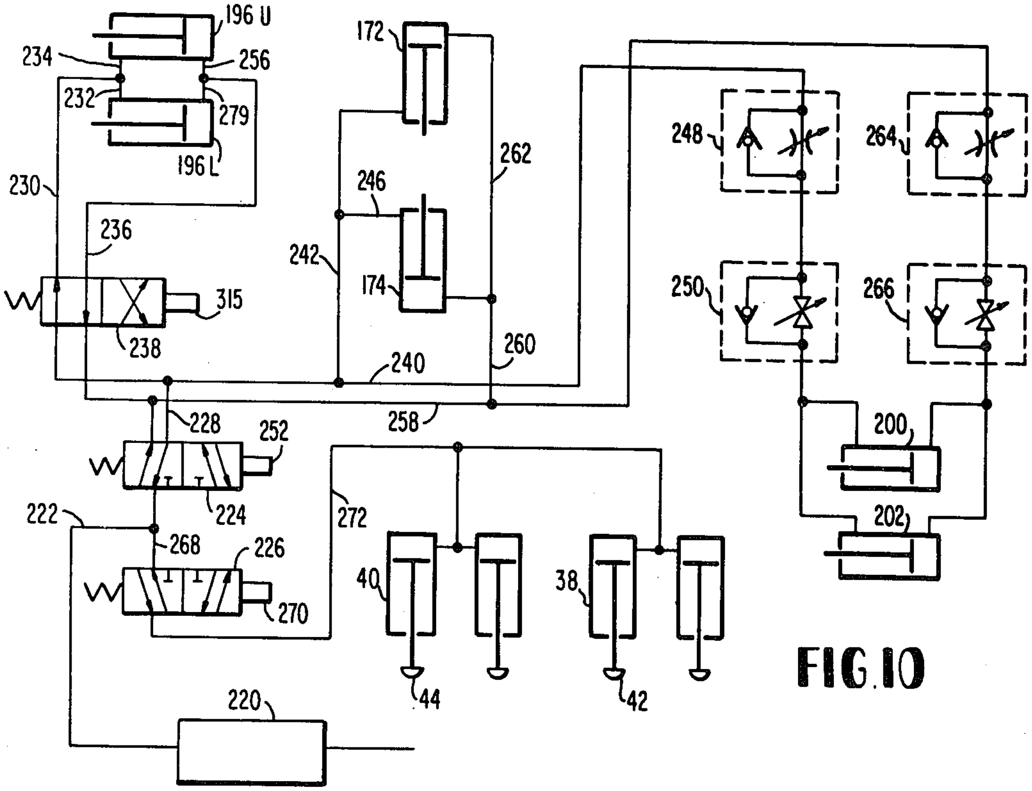
Figure 11:
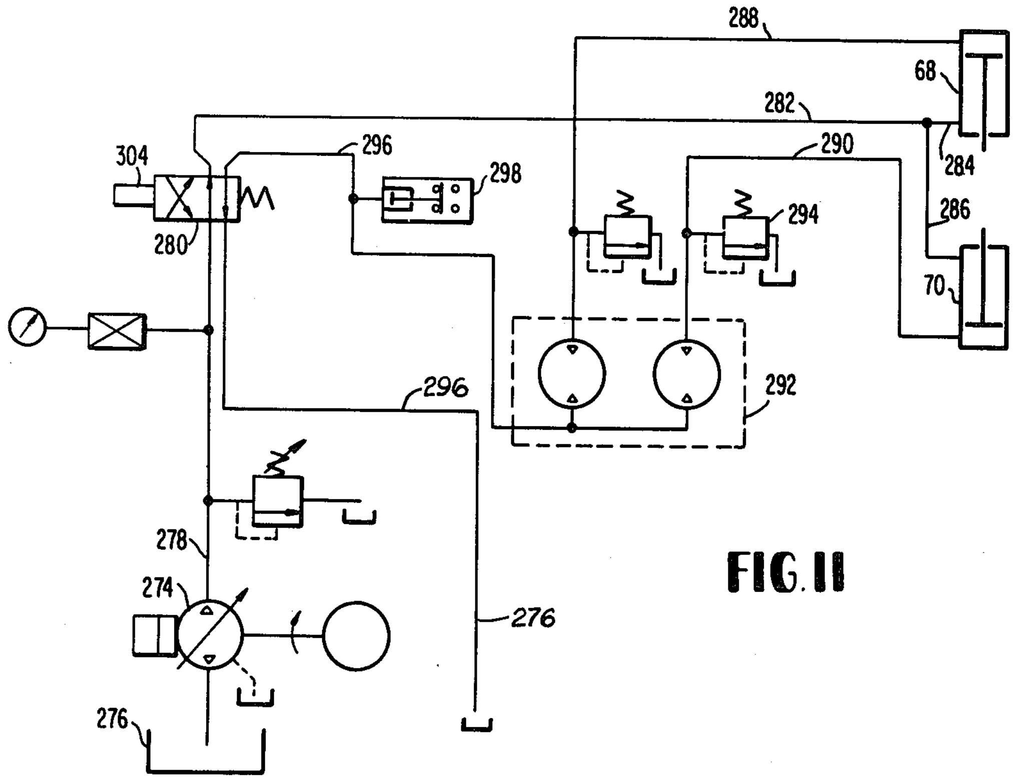
Figure 12:
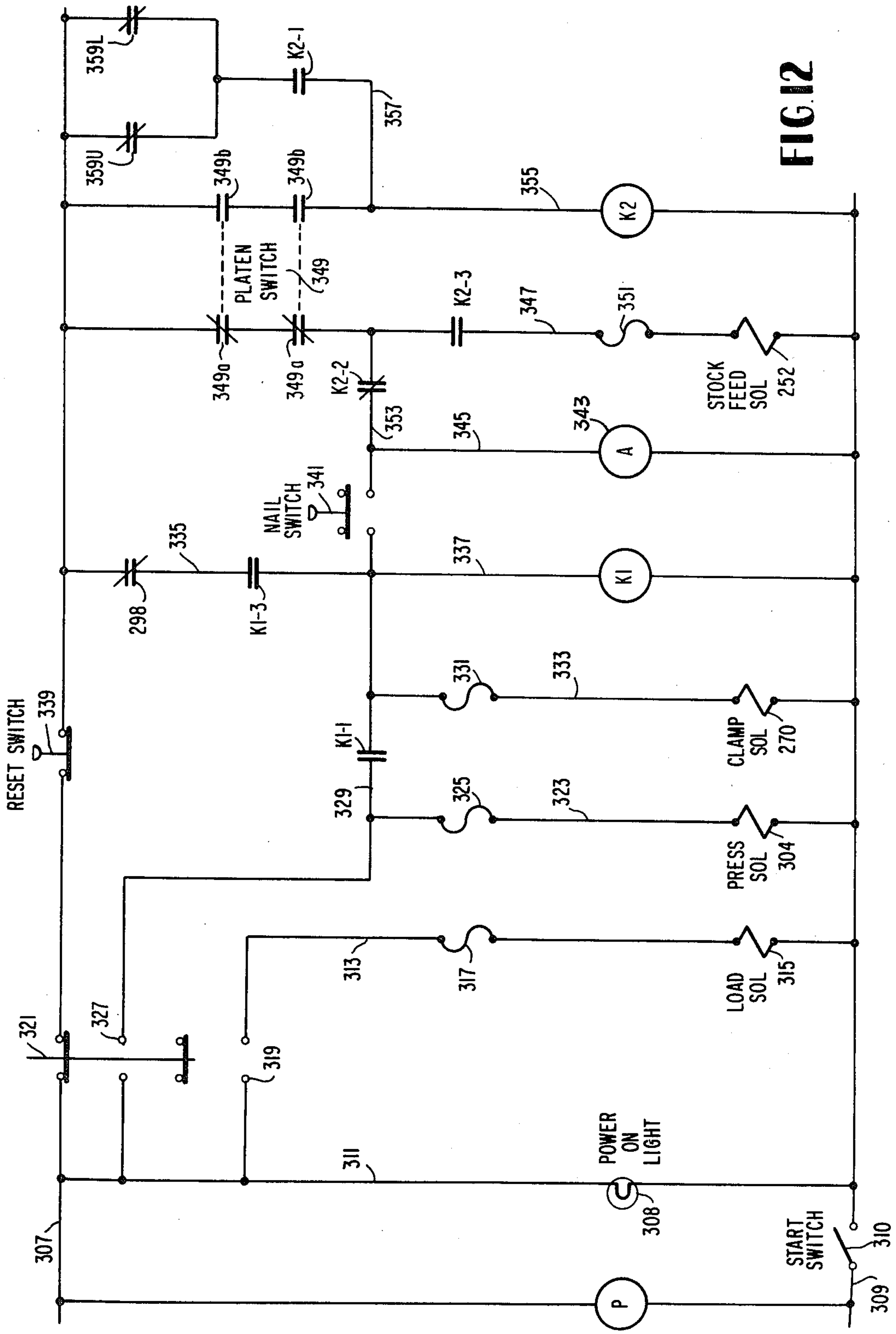

FIGS. 4 and 5 are enlarged cross-sectional views taken about on lines 4—4 and 5—5 respectively in FIG. 3;

FIG. 6 is an enlarged cross-sectional view taken about on line 6—6 in FIG. 3;

FIGS. 7, 8 and 9 are schematic illustrations in plan of an operational sequence utilizing the apparatus hereof;

FIGS. 10 and 11 are schematic views of pneumatic and hydraulic circuits for use in the present invention; and FIG. 12 is a schematic view of an electrical circuit for use with the present invention.

Referring now to the drawings, particularly FIGS. 1, 2 and 3, there is illustrated an apparatus constructed in accordance with the present invention generally designated 10 and including a pair of longitudinally spaced conveyor tables 12 and 14, upper and lower press assemblies 16 and 18, respectively, feed assemblies 20 and 22 for the respective press assemblies 16 and 18, and coils 24 and 26 for carrying connector plate stock. As illustrated in FIG. 2, the conveyor tables 12 and 14 are longitudinally spaced relative to one another to leave an opening 30 in vertical registry with the upper and lower press assemblies 16 and 18. Conveyors 12 and 14 are suitably supported by stanchions, not shown. A fence 32 extends continuously along one side of conveyor tables 12 and 14 and spans the opening 30 therebetween. Discrete fences 34 and 36 are provided on the opposite side of each conveyor table 12 and 14. For purposes noted more particularly hereinafter, an elongated support bracket 35 extends across opening 30 in longitudinal alignment with fences 34 and 36. Bracket 35 has a plurality of longitudinally spaced openings 37 (FIG. 3) for selectively positioning a pin or stop 39 which projects inwardly toward the opposite fence 32 whereby, as will be appreciated from the ensuing description, the butt joint can be located in the center of the connector plate.

Each conveyor table 12 and 14 carries a pair of longitudinally spaced alignment and clamp cylinders 38 and 40, respectively. The cylinders are suitably secured to the respective conveyor tables and have pistons 42 and 44, respectively, which are operable to extend and retract transversely across the tables to engage lumber pieces designated P disposed thereon. The cylinders serve to releasably clamp the lumber pieces against fence 32 for obtaining and maintaining accurate longitudinal alignment of the lumber pieces during pressing operations in a manner described in detail hereinafter.

The upper and lower press assemblies 16 and 18, the feed assemblies 20 and 22 and coils 24 and 26 are symmetrically arranged over and under conveyor tables 12 and 14. Carried at adjacent ends of conveyor tables 12 and 14 is a pair of vertically transversely extending generally C-shaped frames 46 and 48. The front frame 48 has an enlarged opening 50, while frame 48 has a smaller central opening 52 with openings 54 and 55 on either side of central opening 52.

Referring particularly to FIG. 3, blocks 60 and 62 are mounted between frames 46 and 48 on opposite sides of conveyor tables 12 and 14. Blocks 60 and 62 threadedly carry the lower and upper ends 64 and 66, respectively, of upper and lower press cylinders 68 and 70. Suitable lock nuts, for example, those illustrated at 72, are provided for maintaining the press cylinders securely mounted to blocks 60 and 62, respectively. The pistons 74 and 76 of the upper and lower press cylinders carry upper and lower press platens 78 and 80, respectively. For purposes described hereinafter, plates 78 and 80 carry recessed magnets 79 and 81, respectively, in their opposed faces. The rear edges of platens 78 and 80 are provided with respective mounting blocks 82 and 84 which, in turn, mount cutting blades 86 and 88, respectively, movable with the platens. A pair of plates 90 and 92 are suitably secured to the frame 48. The forward face of plate 90 provides a guide surface for the rear face of mounting block 82 and movable cutting plate 86 carried by upper platen 78, plates 90 and 92 having registering apertures 91 and 93 in registry with opening 54 through frame 48. Similarly, a pair of plates 94 and 96 are secured to frame 48 on the underside of the conveyor. The forward face of plate 94 serves as a guide surface for mounting block 84 and movable cutting blade 88 carried by the lower platen 80, plates 94 and 96 having registering apertures 95 and 97 in registry with opening 55 through frame 48. Each plate 90 and 94 is recessed along its forward face to carry respective fixed cutting blades 98 and 100. As illustrated in FIG. 4, the cutting blades 98 and 100 are each comprised of a plurality of transversely spaced cutting blade segments providing for ease of replacement of the blades. Also, the upper surface of blade 98 as well as the lower surface of blade 100 is provided with a plurality of tines 102 and 104 respectively which define grooves along the cutting surfaces. As will be appreciated from the ensuing description, the grooves defined by tines 102 and 104 receive the teeth of the connector stock as the latter is fed forwardly through openings 54 and 55 whereby the stock is laterally supported with only the base portions of the plate being cut as set forth in detail in the prior mentioned U.S. patent application.

As illustrated in FIG. 2, pairs of arms incline from the upper and lower edges of frame 48 for support of reels 24 and 26. Particularly, a pair of arms 110 incline upwardly and rearwardly from the upper edge of frame 48 and carry the reel 24 containing connector stock for use in conjunction with the upper press assembly 16. A pair of arms 112 incline downwardly and rearwardly from the lower edge of frame 48 and carry the lower reel 26 containing a connector stock for use with the lower press assembly 18. More particulary, the pairs of arms 110 and 112 are slotted, for example, at 114 (FIG. 2), for receiving outwardly projecting pins 116 carried by reel arbors 118. The reels each include a hub 120 and side plates 122, the hub 120 having a larger diameter than arbors 118. In this manner, the reels are offset downwardly with their centers of gravity below the axis of rotation to provide a pendulum effect thereby preventing any tendency of the stock when its free end is fixed to rotate the reel and become unwound.

Referring now to FIG. 3, the coiled connector stock S is fed from the upper and lower reels by feed assemblies 20 and 22, respectively, toward press platens 78 and 80. The upper feed assembly 20 includes a pair of plates 130 and 132 having horizontally registering apertures 134 and 136, respectively, in registry with apertures 54, 93 and 91, for receiving the stock S from upper reel 24. The rear face of plate 130 provides an abutment for an upperslide block 138. Likewise, the lower feed assembly 22 includes a pair of plates 140 and 142 apertured at 144 and 146, respectively, in registry with apertures 55, 97 and 95 for receiving the connector stock S from the lower reel 26. The rear faces of plates 130 and 140 serve as abutments for slide blocks 138 and 148 respectively. Plates 130 and 140 also respectively support a pair of laterally spaced guide rods 149 and 150. Slide blocks 138 and 148 are thus mounted on the pairs of slide rods for longitudinal sliding movement therealong. Guide blocks 138 and 148 carry respective jaws 160 and 162 which are grooved in a longitudinal direction to form transversely spaced tines 164 and 166, respectively. That is to say, these surfaces form longitudinally extending comb-like surfaces which receive the teeth of the connector stock as it is fed forwardly to the press platens. Carried on each of the upper and lower slide blocks 138 and 148 are upper and lower cylinder brackets 168 and 170, respectively. These brackets are generally U-shaped and are bored at their bases to threadedly receive upper and lower clamping cylinders 172 and 174, respectively. Cylinders 172 and 174 mount grippers 176 and 178 on the ends of their respective piston shafts. It will be appreciated that extension of the grippers towards the opposite jaws clamps the connector stock between the tines of the jaws and the grippers. The jaws may be provided with suitable inserts having serrated edges, for example, as illustrated at 180 in FIG. 5, to enhance the clamping action. It will be appreciated from the foregoing description that the upper and lower clamping cylinders, the jaws carried thereby and the grippers are mounted for longitudinal sliding reciprocating movement along the respective pairs of rods 149 and 150.

The opposite ends of upper rods 149 are secured to a stock guide and alignment block 182 which has a recess 184 defining a passage for the stock S en route to the press platen 78. Likewise, the opposite ends of lower rods 150 are secured to a stock guide and alignment block 186 which has a recess 188 for receiving the stock S from lower reel 26 en route to platen 80. One or more spacers 189 can be disposed ahead of block 186 on rods 149 to reduce the length of the stroke of the grippers and hence determine the length of plate to be cut at the cutting blades.

Referring to FIG. 6, the lower guide and alignment block 186 has a transversely extending bore 190 on one side thereof and in which is received a pilot pin 192. The outer end of pin 192 is carried by a cylinder plate 194 which, in turn, is mounted on the piston shaft of a pilot cylinder 196. The pilot cylinder 196 is secured to block 186 by a cylinder bracket 198. Accordingly, it will be appreciated that extension and retraction of the piston within the cylinder 196 causes the pilot pin 192 to retract and extend into the passage 188 for purposes as will become apparent from the ensuing description. The upper block 182 is similarly constructed and further description thereof is believed unnecessary. Feed cylinders 200 and 202 are secured respectively to the blocks 182 and 186. The piston rods 204 and 206 of cylinders 200 and 202 are connected to the blocks 138 and 148 respectively. It will be appreciated that extension and retraction of pistons 204 and 206 causes the clamping cylinders 172 and 174, jaws 164 and 166, and gripper elements 176 and 178 to reciprocate back and forth along the respective rods 149 and 150.

Referring to FIG. 10, there is illustrated a schematic diagram of a pneumatic circuit for the feed and clamp assemblies. As illustrated, there is provided an air source 220 connected in parallel via a conduit 222 with two four-way five-port, two-position solenoid-actuated spring-return valves 224 and 226. Valve 224 serves to provide air to the pilot, stock clamp and feed cylinders 196U, 196L; 172, 174; and 200, 202, respectively. Valve 226 provides air to the lumber clamp cylinders 38 and 40. As illustrated, valve 224 is spring-biased to the illustrated position wherein air is delivered to pilot cylinders 196U and 196L via conduits 228, 230, 232 and 234 to maintain the pilot cylinders in a retracted position with the pilot pins engaged between the teeth of the stock. Conduits 230 and 236 flow through a four-way, two-position solenoid-actuated spring-returned valve 238 for purposes described hereinafter. In its illustrated position, valve 224 also communicates air via lines 240, 242, and 246 to the stock clamp cylinders 172 and 174 to maintain the latter in a retracted position. Air is also provided via flow control valve 248 and a time delay valve 250 to feed cylinders 200 and 202 to maintain them in retracted positions. It will be appreciated that the opposite sides of the various cylinders are exhausted to a reservoir via conduits which will now be described in connection with the actuation of the various cylinders.

Upon energization of the stock feed solenoid 252 associated with valve 224, the valve is shifted to provide air via conduits 222, 258, 236, 279 and 256 to extend the pilot cylinders 196U and 196L whereby the pilot pins 192 are retracted from between the teeth of the stock. Air is also provided upper and lower clamping cylinders 172 and 174, respectively, via conduits 258, 260 and 262 to extend the grippers 176 and 178 whereby the upper and lower stock is clamped between the grippers and the jaws 164 and 166, respectively. Air is also provided feed cylinders 200 and 202 via conduit 258, flow control valve 264 and a time delay valve 266 to extend their pistons whereby clamping assemblies 20 and 22 and the stock clamped thereto is advanced.

Valve 226 is connected via a conduit 268 with the air supply. In the illustrated position, valve 226 supplies air to exhaust ports, which are plugged. Cylinders 38 and 40 are spring-biased to maintain their clamp heads in a retracted position. Upon energization of the solenoid 270 associated with valve 226, the latter shifts to supply air via conduit 272 to each set of cylinders 38 and 40 to extend heads 42 and 44 against the side edges of the lumber pieces and clamp the latter against fence 32. Upon de-energization of solenoid 270, the spring returns the valve to the illustrated ports. The clamp heads then spring back to their retracted position.

Referring to FIG. 11, there is illustrated a hydraulic circuit for the press cylinders 68 and 70 for each of the press assemblies. A variable displacement pump 274 supplies fluid from a reservoir 276 via a conduit 278 and through a directional control valve 280 to one side of the press cylinders and to maintain the press platens in a retracted position. Particularly, conduit 278 connects with a conduit 282 connected in parallel with the press cylinders, on upper and lower sides of the machine via conduita 284 and 286. The opposite side of the press cylinders are connected via conduits 288, 290 with a flow divider 292 via relief valves 294 in each of lines 288 and 290. A conduit 296 communicates between the flow divider 292 and a reservoir 276 via valve 280. A pressure actuated switch 298 lies in communication with conduit 296.

In operation, hydraulic fluid is provided upper and lower press cylinders 68 and 70 by motor 274 and conduits 278, 282, 284, and 286. Upon energization of solenoid 304 associated with valve 280, the latter valve shifts to supply fluid to the flow divider 292 and to the press cylinders 68 and 70 via conduits 288 and 290 to extend the press platens carried thereby. Flow divider 292 serves to equalize the flow of the fluid supplied press cylinders to ensure uniform pressing action. Fluid returns to reservoir 276 from the opposite sides of cylinders 68 and 70 via conduits 284, 286, 282 and 296. Upon completion of the pressing action, the solenoid 304 is de-energized whereby valve 280 is spring-returned to the illustrated position. Fluid again flows to the press cylinders 68 and 70 via conduits 282, 284, and 286 to retract the platens and maintain them in a retracted position.

Referring now to FIG. 12, which is a schematic representation of an electrical control circuit for the machine hereof, the circuitry is illustrated in a detached contact mode wherein the various relays represented by circles open and close associated contacts in a manner to be described, normally open and closed contacts being denoted by the pairs of parallel lines and slashed pairs of parallel lines, respectively except where such notation is designated a switch. The contacts have numeral suffixes corresponding to the numeral suffixes of their actuating relay, the second numeral suffix indicating a particular contact.

117 volts 60 cycle current is provided across lines 307 and 309 by a suitable power source P and which power source also provides power for hydraulic pump 274. Connected across the power source in line 311 is a power-on light 308, which indicates that the unit is energized. In line 309, there is provided a start switch 310. Connected in series across the power supply line by line 313 is a load solenoid 315, a fuse 317 and normally open contacts 319 which form part of a load switch 321. Connected in series by a line 323 is a press solenoid 304 and a fuse 325, line 323 connecting these elements across the power supply via normally open contacts 327 which form another part of the load switch 321. Connected in parallel with press solenoid 304 are normally open contacts K1-1 in line 329 and a clamp solenoid 270 and a fuse 331 are connected in series by line 333. Connected in series across the power supply by lines 335 and 337 are the normally closed contacts of a nail pressure switch 298, normally open contacts K1-3 and a relay K1, line 329 connecting with line 337 between relay K1 and contacts K1-3. Between lead lines 335 and load switch 321 there is provided a reset switch 339. A normally open nail command switch 341 is disposed in line 329 and a nail enabling light 343 is connected by line 345 between lines 329 and 309. Connected in series across the power supply by line 347 are the normally closed contacts **349*a* of a platen limit switch 349, normally open contacts K2-3, a fuse 351 and the stock feed solenoid 252. A line 353 connects with line 347 between contact K2-3 and platen limit switch 349, line 353 being connected to line 329 through the nail command switch 341 and normally closed contacts K2-2. Line 355 connects across the power supply and serially connects relay K2 and normally open contacts 349*b* of the platen limit switch 349. The contacts 349*b* are mechanically connected to contacts 349*a*, respectively. Connected in parallel across the platen limit switch 349 and by a line 357 are normally open contacts K2-1 and upper and lower feed limit switches 359U and 359L** having normally closed parallel connected contact sets.

In operation, the start switch 310 is closed to provide power across lines 307 and 309 and the power-on light 308 indicates that power is available to the circuit. In this rest condition of the circuit with the power applied across lines 307 and 309, it will be appreciated that relays K1 and K2, load solenoid 315, press solenoid 304, clamp solenoid 270, and the stop feed solenoid 252 are de-energized. The nail enabling light 343 is lighted by power supplied across lines 347, 353, and 345. With the reels located on the arbors, load switch 321 is rotated to close contacts 319 thereby energizing solenoid 315. Energization of solenoid 315 shifts valve 238 to the left in FIG. 10 whereby air is provided pilot cylinders 196U and 196L to extend their pistons and withdraw the pilot pins from passages 184 and 188. Rotation of load switch 321 also closes contacts 327 thereby energizing the press solenoid 304. Energization of solenoid 304 shifts valve 280 to cause the press platens to move toward one another into fully extended positions blocking the ends of passages 91 and 95. The coiled stock is then fed from the upper reel through passage 184, tines 164, passages 134, 136, 54, 93 and 91 and tines 102 into abutment against the press platen 78. Likewise the coiled stock from the lower reel 26 is fed through passage 186, tines 166, passages 144, 146, 55, 97, 95 and tines 104 into abutment against the press platen 80. Lead switch 321 is then rotated to de-energize solenoid 315 which returns valves 238 and 280 to the illustrated positions. Return of these valves inserts the pilot pins between the rows of teeth and returns the press platens to their original positions. If the stock is misaligned with the cutting edge aligned along a transverse row of teeth of the connector stock, the pilot pins engage the teeth to slightly displace the stock to a location wherein the cutting edge is aligned between transversely adjacent rows of teeth.

Upon initial movement of the press platens, contacts **349*b* closes to energize relay K2 which closes contacts K2-1 and K2-3. Closing contacts K2-3 does not, however, energize the stock feed solenoid since contacts 349*a* open upon initial movement of the press platens. Return of the platens close contacts 349*a* to energize stock feed solenoid 252, relay K2 being held energized through contacts 359U and 359L and closed contacts K2-1. Upon energization of the stock feed solenoid 252, air is provided pilot cylinders 196U and 196L to extend their pistons and withdraw the pilot pins from between the teeth. Also, cylinders 172 and 174 extend their grippers to clamp against the stock, and feed cylinders 200 and 202, after a time delay, advance the stock a preselected distance between the platens. At the end of the feed stroke, contacts 359U and 359L open to de-energize the holding circuit for relay K2 whereby contacts K2-3 and K2-1 are returned to their illustrated open positions. Solenoid 252 is thus de-energized and valve 224 spring returns to supply air to cylinders 196U and 196L to insert the pilot pins between the rows of teeth of the stock, to cylinders 172 and 174 to retract grippers 176 and 178 from engagement with the stock, and to cylinders 200 and 202** to retract, after suitable time delay, the stock feed assembles.

The machine is now ready to connect a pair of butted members in a manner which will now be described. Referring particularly to FIGS. 7, 8 and 9, lumber pieces L1 and L2 are disposed on the conveyor tablets 12 and 14. The leading lumber piece L1 is disposed against fence 32 while the trailing lumber piece L2 is disposed against fence 36. Lumber pieces L1 and L2 are butted end-to-end and manually displaced along the conveyor tables until the leading end of the trailing lumber piece L2 butts stop 39. It will be appreciated from a review of FIG. 7 that stop 39 extends inwardly a short distance such that the leading lumber piece L2 is slidably received on the conveyor tables between fence 32 and stop 39. Accordingly, since stop 39 is located in selected ones of the openings 37 such that its trailing edge lies substantially centrally of the connector plates extending between the platens, the joint lying between lumber pieces L1 and L2 is thus located in accurate longitudinal position relative to the press platens and the connector plates to be applied to the joint. A weighted roller 41 is pivotally secured to the forward end of conveyor table 12 and bears on the top of lumber piece L1 to prevent continued forward movement thereof when the trailing lumber piece L2 butts stop 39. As will be appreciated from the ensuing description, the clamps 38 and 40 are actuated to displace lumber pieces L1 and L2 against fence 32 as particularly illustrated in FIG. 8 whereby accurate transverse alignment of the lumber pieces one with the other is obtained prior to application of the connector plates to the joint. With the lumber pieces L1 and L2 located relative to the stop and the platens 78 and 80 as illustrated in FIG. 8, and with the machine in the condition previously described, that is, with portions of the connector stock located between the press platens on opposite sides of the joint, the machine is ready to complete the joint. Particularly, the nail command switch 341 is momentarily depressed to energize relay K1 through lines 307, 347, 353 and 337 (FIG. 12). Energization of relay K1 closes normally open contacts K1-3 to complete a holding circuit for relay K1 through lines 335 and 337 and the normally closed contacts of press switch 298. Energization of relay K1 also closes normally open contacts K1-1 whereby press solenoid 304 is energized through lines 335, 329 and 323 and clamp solenoid 270 is energized through lines 335, 329, and 333. Energization of clamp solenoid 270 shifts valve 226 to supply air to clamps 38 and 40 whereby the clamp heads 42 and 44 extend to clamp lumber pieces L1 and L2 against fence 32 as illustrated in FIG. 8. Energization of press solenoid 304 enables fluid to flow to cylinders 68 and 70 to displace platens 78 and 80 toward one another whereby the stock is cut to form discrete upper and lower connector plates and the teeth of the plates are embedded on opposite sides of the joint between lumber pieces L1 and L2. Upon embedment of the teeth and completion of the pressing operation, the pressure actuated switch 298 opens its normally closed contacts to de-energize the holding circuit for relay K1 which, upon de-energization, returns contacts K1-1 and K1-3 to their normally open positions. Opening contacts K1-3 de-energizes the press and clamp solenoids 304 and 270, respectively, whereupon valves 280 and 226 are spring returned and the platens and clamps returned to their normal positions.

It will be recalled that upon movement of the press platens toward one another, the normally open platen contacts **349*b* closed energizing relay K2 via line 355 which, in turn, closes normally open contacts K2-1 and K2-3 and opens normally closed contacts K2-2. Opening normally closed contacts K2-2 de-energizes the nail enabling light 503 and also turns off the nailing command circuit. Closing normally open contacts K2-1 completes a holding circuit for relay K2 through lines 357 and 355 and the normally closed feed limit switches 359U and 359L. Closing contacts K2-3, however, does not complete the circuit to the stock feed solenoid 252 since contacts 349*a* of the platen limit switches are held open until the platens return to their retracted positions. Upon their return, contacts 349*a* return to their normally closed positions whereby the stock feed solenoid 252 is energized through line 347 to advance the feed assemblies as noted previously. At the end of the stock feed strokes, the normally closed contacts 359U and 359L of the feed limit switches open to de-energize relay K2. De-energization of relay K3 returns contacts K2-1 and K2-3 to their normally open positions whereupon the stock feed solenoid 252** is de-energized and normally closed contacts K2-2 close, lighting the nail enable light and enabling the nail command circuit.

It will thus be appreciated that the lumber pieces L1 and L2 are joined one to the other as illustrated in FIG. 8 in endwise butting relation. In FIG. 9, a third lumber piece L3 is moved into position such that its forward end butts the trailing end of the lumber piece L2. It will be appreciated that lumber piece L3 is advanced along conveyor table 14 in a laterally offset position from the lumber pieces L2 and L1 and that it may be joined to the trailing end of lumber piece L2 in a similar manner as described previously with respect to joining lumber pieces L2 and L1. Thus, two or more short pieces of lumber may be joined end-to-end one to the other to form a unitary lumber piece. Consequently, small pieces of lumber which might under normal practice be earmarked for scrap can be joined to form larger pieces. Also, lumber pieces having defects in them can be salvaged. The defective areas of the piece can be cut out with the resulting pieces subsequently joined one to the other in endwise relation the the machine hereof. Thus, significant savings in lumber can be effected by use of the present machine.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A method of joining a pair of longitudinally aligned end to end butting wooden members by applying a sheet metal connector plate of the type having integrally struck teeth projecting from one side thereof to joints formed between the wooden members comprising the steps of:

(1) providing a coil of connector stock of the type having integrally struck teeth projecting from one side thereof;

(2) feeding the connector stock from the coil to a presshead which is movable along a predetermined path and carries a cutting edge for cutting the stock as the presshead moves along the said path, thereby to form a connector plate of predetermined length;

(3) aligning a stop at a predetermined position relative to said predetermined path for said presshead;

(4) locating the joint between the longitudinally aligned end to end butting wooden members in opposition to the path of movement of said presshead by butting the leading end of trailing wooden member against said stop;

(5) clamping the said wooden members in the said longitudinally aligned butting end to end relation;

(6) moving said presshead in said predetermined path and cutting the stock to form a connector plate of predetermined length; and (7) upon further movement of the presshead, pressing the teeth of the connector plate thus formed into one side of the adjoining wooden members.

2. The method according to claim 1 wherein the steps of cutting the connector stock and embedding the teeth of the connector plate occur in the same stroke of the presshead.

3. The method according to claim 1 including the steps of: providing a second coil of connector stock of the type having integrally struck teeth projecting from one side thereof, feeding the connector stock from the second coil to a second presshead which is cooperateable with the first presshead, is movable along a predetermined path and carries a cutting edge for cutting the stock as the presshead moves along the said path, thereby to form a connector plate of predetermined length, moving the second presshead in said predetermined path and cutting the stock from the second coil thereof to form a second connector plate of predetermined length, and pressing the teeth of the second connector plate into the opposite side of the adjoining wooden members.

4. The method according to claim 3 wherein the steps of embedding the first and second connector plate in opposite sides of the members are accomplished substantially simultaneously with each providing a reaction force for the other, and wherein the steps of cutting the connector stock to form the first connector plate and embedding the teeth thereof occur in the same stroke of the first press, the steps of cutting the connector stock to form the second connector plate and embedding the teeth thereof occur in the same stroke of the second press.

5. The method according to claim 1 including the step of adjusting the location of the leading portion of the connector stock relative to the cutting edge such that the cut is made between two transverse rows of teeth.

6. The method according to claim 1 including the steps of locating the wooden members in laterally offset positions relative to one another on a support table, moving the wooden members along the support table, butting the leading end of the trailing wooden member against a stop, and displacing at least one of the wooden members laterally into logitudinal alignment with the other wooden member.

7. A method of joining a pair of longitudinally aligned end to end butting wooden members by applying a sheet metal connector plate of the type having integrally struck teeth projecting from one side thereof and corresponding elongated slots therein to joints formed between the wooden members comprising the steps of:

(1) providing a coil of connector stock of the type having integrally struck teeth projecting from one side thereof;

(2) feeding the connector stock from the coil to a presshead which is movable along a predetermined path and carries a cutting edge for cutting the stock as the presshead moves along the said path, thereby to form a connector plate of predetermined length;

(3) locating the joint between the longitudinally aligned end to end butting wooden members in opposition to the path of movement of said presshead including the steps of locating the wooden members in laterally offset positions relative to one another on a support table, moving the wooden members along the support table, butting the leading end of the trailing wooden member against a stop, and displacing at least one of the wooden members laterally into longitudinal alignment with the other wooden member;

(4) clamping the said wooden members in the said longitudinally aligned butting end to end relation;

(5) moving said presshead in said predetermined path and cutting the stock to form a connector plate of predetermined length and placing the plate on the joint so that the elongated slots are normal to the joint line; and (6) upon further movement of the presshead, pressing the teeth of the connector plate thus formed into one side of the adjoining wooden members.

* * * * *